United States Patent Office 3,297,542
Patented Jan. 10, 1967

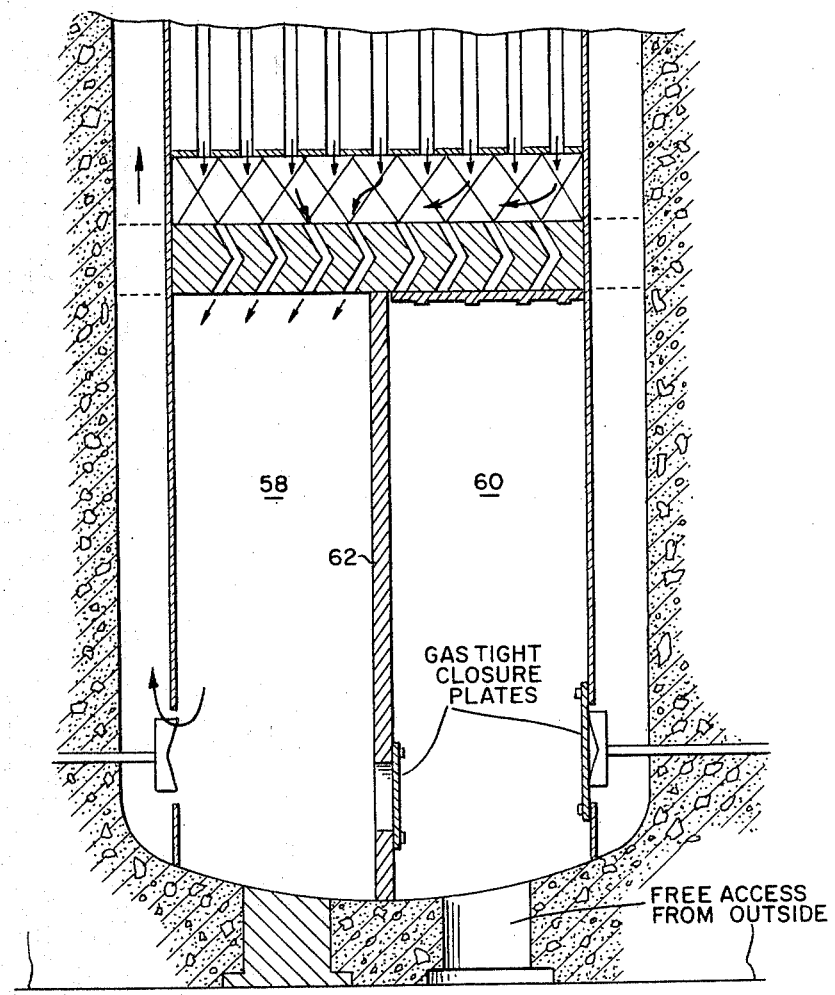

3,297,542
INTEGRAL NUCLEAR REACTOR-HEAT
EXCHANGER POWER PLANT
Didier Costes, Paris, France, assignor to Commissariat
à l'Energie Atomique, Paris, France
Original application Apr. 4, 1963, Ser. No. 270,675, now
Patent No. 3,280,905, dated Oct. 25, 1966. Divided
and this application Aug. 24, 1965, Ser. No. 482,189
Claims priority, application France, Apr. 13, 1962,
894,486
3 Claims. (Cl. 176—59)

The present application is a division of my copending application Ser. No. 270,675, filed on April 4, 1963, now Patent No. 3,280,905.

The invention relates to nuclear reactors of the "integral" type, in which the reactor core and heat exchangers for heat exchange between the reactor coolant and a second fluid are both contained in a single pressure vessel adapted to withstand the coolant pressure.

The large size heat exchangers of the prior art which are required in nuclear reactors for power production have serious disadvantages: The elements of the coolant circuit are inserted, after construction of the pressure vessel, through an opening formed in the pressure vessel, which is obviously very large. Considerations relating to the structural design and strength of the pressure vessel make it necessary to limit said opening to a small size. Since the prior art heat exchange elements are constructed in the shape of long cylinders which are placed side by side in the vessel and joined together by effecting all the requisite connections, it is necessary to arrange in the line of extension of the opening and towards the exterior a free space having at least the length of one heat exchange element, and it is not possible to remove any heat exchange element for repair purposes without also removing all the elements which are located between that element and the opening, unless provision is made for very substantial spaces devoid of heat exchange elements in the interior of the vessel.

The above-mentioned disadvantages are particularly serious in the integral nuclear reactors in which the nuclear fuel charge-discharge apparatus, the reactor core, a support plate which forms a radiation shield, and the heat exchanger are vertically disposed in that order from the top downwards, the coolant being caused to circulate in a closed loop through the core and heat exchangers by means of pumps or blowers.

In this arrangement, the heat exchange elements can only be introduced from the side or from underneath, which makes it necessary to reduce the length of said elements. Furthermore, in view of the fact the operation of the reactor is conditioned by the operation of the heat exchanger, it must be made possible to replace any defective heat exchange element rapidly and therefore without any rehandling of a large number of elements. However, pressurized space is costly, and for this reason it is necessary to avoid making provision in the interior of the vessel for handling passageways which would consume a substantial proportion, for example one-half, of the available volume.

It is an object of the invention to provide an integral reactor having improved heat exchangers in which a failed element can be replaced more readily than in previous constructions;

It is another object of the invention to provide an integral reactor construction which enables repair and maintenance work to be performed on said heat exchanger in order to replace certain elements without putting the entire heat exchanger out of operation.

Other objects and their attendant advantages will become apparent as the following detailed description is read in conjunction with the accompanying drawings wherein.

Figure 3:
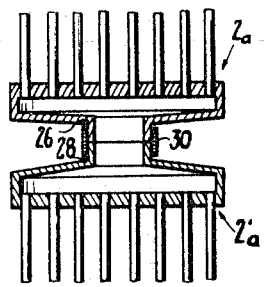
FIG. 3 is a diagrammatic sectional view, on a plane which passes along the axis of the extremities of two elements of a second type and of the device for coupling said extremities.
Figure 4:
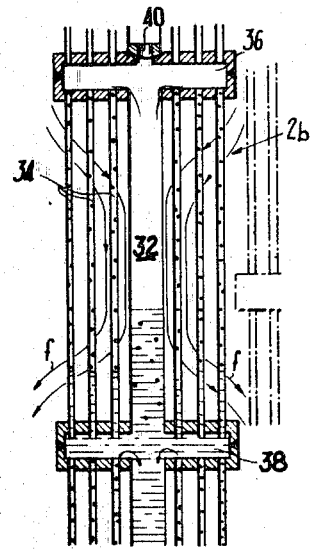
FIG. 4 is a diagrammatic cross-section, taken in a plane which passes along the axis, of a boiler element and of the extremities of the two elements which are coupled thereto.
Figure 2:
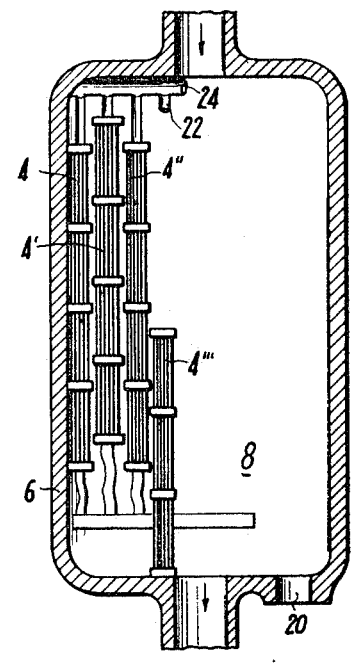
FIG. 2 is a diagrammatic view taken in longitudinal cross-section and showing the general arrangement of a heat exchange apparatus which is fitted with elements of the type shown in FIG. 1.
Figure 5:
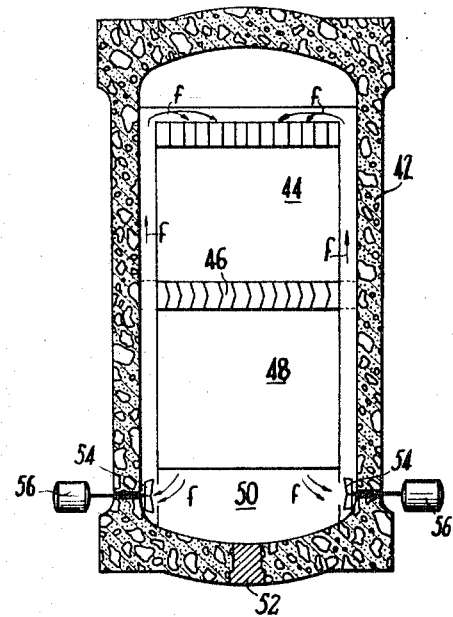
FIG. 5 shows diagrammatically in longitudinal cross-section a nuclear reactor fitted with an integrated heat-exchange apparatus in accordance with the invention.
Figure 6:
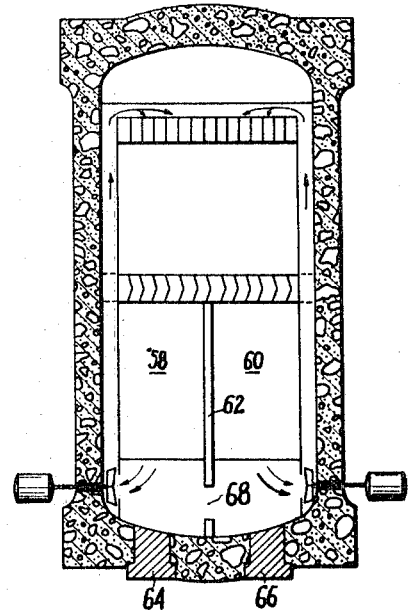
Figure 7:
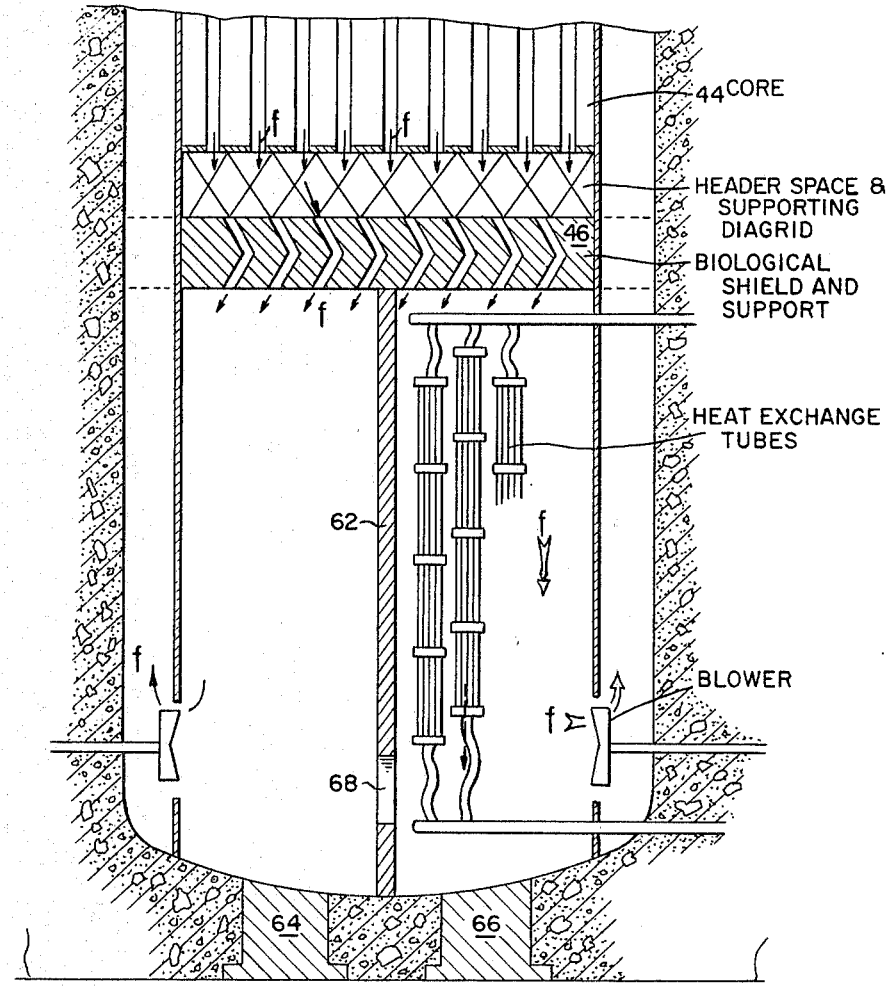

FIG. 6, which is similar to FIG. 5, shows a nuclear reactor fitted with an integrated heat-exchange apparatus in accordance with an alternative form;

FIG. 7 is a view similar to FIG. 6 with heat-exchange apparatus as shown in FIGS. 2, 3 and 4 mounted in the right chamber thereof; and FIG. 8 is a view similar to FIG. 6 in enlarged detail showing conventional means for supporting the core of the reactor above the support plate and radiation shield and showing suitable means for closing the openings of the right chamber.

Figure 1A:
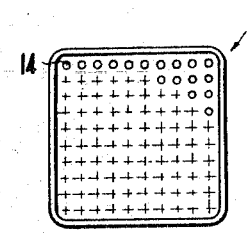
FIGS. 1a and 1b are diagrammatic views of a first type of heat exchange element, taken respectively from above and in cross-section in a plane which passes along the axis.
Figure 1B:
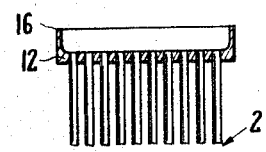

FIGS. 1a and 1b show a heat exchanger element 2 in accordance with the invention which is intended to be assembled together with identical elements in a row which consists, for example, of three or four elements, such as the rows 4, 4', 4" and 4''' of FIG. 2. These rows are juxtaposed inside a pressure vessel 6, a free space 8 being formed between the end of the row and the wall of the vessel. When disengaged from its various connections, one row can accordingly slide along its axis and come into the position in which the row 4''' is located as shown in FIG. 2 so as to permit the disassembly of its first element. All the elements can thus be successively removed.

The exchange element which is illustrated by way of example in FIG. 1 consists of 81 exchange tubes such as the tube 10, each exchange tube being joined to two square header plates 12 and 14. Said header plates are provided with peripheral flanges 16 and 18 intended for the purpose of coupling elements 2 which are aligned by means of butt welds.

In the juxtaposed assembly of rows, the obstructions which correspond to the square header plates such as the header plates 12 and 14 must be displaced so as to permit the circulation of fluid and to play the part of baffles, thereby making it possible to intensify the heat transfer. There can be added to the said obstructions auxiliary baffles, of sheet iron, for example (not shown in the drawings).

The assembly of the exchanger elements in the interior of the pressure vessel 6 is readily discernible from FIG. 2 in which three rows 4, 4' and 4" are shown in position while the fourth 4''' is in process of assembly. The lowermost element of the row 4''' has been inserted through the opening 20 and is presented for welding beneath the row 4'''. The steam header 22 of said row is located on top in readiness and is branched, for example, on a general steam header 24. The lower circuit for feeding the rows which is usually constituted by deformable pipes of small diameter has not been illustrated for the sake of clarity of the drawings. The rows of elements are designed to be suspended from the top, for example, from the general steam header 24; it can be seen that the expansion of each row is not interferred with.

When once the cross-sectional area of the pressure vessel has been entirely filled (if necessary with full prismatic elements in the vicinity of the wall), all the hot gas which is supplied from the top flows in a predetermined pattern over the heat transfer surfaces. It will be noted that the dimensions and temperature differences which are met with in nuclear engineering result in tube diameters which are smaller than in conventional heat exchanger designs.

FIG. 3 shows two end-portions 2a and 2a' of heat exchange elements in accordance with an alternative form. Said elements are fitted with terminal connectors 26 and 28 which have a small diameter and which are provided with screw-threads of different pitch (usually in opposite directions). A ring 30 provided with two screw-threads and fitted with sealing joints permits the assembly of the two end-portions. By means of this constructional arrangement, the elements can readily be substituted. The same result could be obtained as a result of the use of flange-couplings.

There has been shown diagrammatically in FIG. 4 the circulation of fluids in the case of a water boiler element 2b, which constitutes an alternative form of the element 2 of FIG. 1. The hot gas which constitutes the first fluid flows in the downward direction along the general path which is indicated by the arrows f. The obstructions which are formed by the header plates of adjacent rows (as shown in chain-dotted lines) cause deviations in the fluid streamlines which are favorable to the processes of heat transfer.

The heated water flows from the bottom upwards inside the element and is vaporized therein. The element 2b comprises a central tube 32 having a diameter which is distinctly larger than that of the other tubes 34. The heating which is more intense inside the tubes 34 than inside the tube 32 creates a natural circulation with upward motion of water-steam mixture inside the tubes 34, separation of water and steam in the top header 36 which is formed of two header plates welded together, and downward flow of water through the tube 32 towards the bottom header 38 for recycling. The heat exchanger element which is located beneath the element 2b can also give rise to a boiling process; in this case the bubbles which pass out of the small tubes 34 are preferably directed towards the central tube 32 and rise up therein while scarcely offering any hindrance to the downflowing water. The tubes 34 of the upper element are thus fed with water without steam, thereby greatly improving the heat transfer process. This result is obtained by permitting the ends of the tubes 34 to project into the interior of the lower header 38, whereas the end of the tube 32 is formed flush with said header. The arrangement noted above as illustrated in the case of the exchange element 2b.

When the top elements play the part of superheaters, it is an advantage to obstruct the circulation of steam in the large central tube, which can be retained for constructional facilities (for example with a view to forming a passage for a radiation source which is intended for the purpose of testing the welds between elements). It is possible to employ for the purpose of throttling the flow a diaphragm 40 which is lowered inside the central tube, then fixed in position.

The foregoing description has related to heat exchange elements having plane header plates and rectilineal tubes; the invention naturally comprises within its scope elements having curved header plates (which approximate, for example, to full spheres or half-spheres) and either elbowed or spiral tubes; the lattice of the rows of elements can be either square or hexagonal, while other arrangements are also feasible.

FIG. 5 illustrates a nuclear reactor which comprises a pressure vessel 42, for example a shell of prestressed concrete fitted with an internal liner, an active core 44, a support plate 46 which forms a partial shield against radiation so that the heat exchanger unit is thereby made accessible shortly after shut-down of the reactor, a heat exchanger unit 48 constructed in accordance with the arrangement which is shown in FIG. 4, and a bottom chamber 50 for the assembly of elements. Access to the chamber 50 through the vessel 42 is provided by an opening fitted with a plug 52. The primary fluid which is cooled in the heat exchanger unit is returned upwards along the periphery of the heat exchanger unit and of the core by means of pumps or blowers 54, along the path indicated by the arrows f. For the sake of greater simplicity, the water and steam conduits have not been illustrated in the drawings. For safety reasons, it is preferable to mount the pumps 54 inside the shell 42. The said pumps are driven, for example, by external motors 56, the rotary shafts of which pass through the vessel structure through sealing joints of known type.

The arrangements which have been described in the foregoing would again be met with in a heat exchanger unit located above the reactor core. In this case, the heat exchanger elements can be either introduced or withdrawn through the pressure vessel wall at the base of the assembly chamber after being placed in a horizontal position.

The juxtaposed rows of heat exchange elements form as a result of their staggered relation at least two groups from the point of view of the thermal behavior of said elements. Different pressures, flow rates and water levels can be employed in the various groups so as to obtain the maximum power recovery. The top steam headers can be branched on the general headers only after having been passed through the pressure vessel wall, thereby reducing the gravity of possible accidents in the interior of the vessel.

In the case of a nuclear reactor, it is usually necessary to remove a certain quantity of heat after shutdown of the reactor. Accordingly, a flow of air can be caused to circulate through the reactor core after having been previously cooled by an exchanger which can be located outside the shell; this expedient makes it possible to carry out maintenance or replacement operations in the main heat exchanger apparatus. However, this solution entails the addition of an external heat exchanger.

In order to eliminate this requirement, it is possible to subdivide the main heat exchanger into two chambers 58 and 60 (as shown in FIG. 6) by means of a wall 62 which does not have to withstand pressure. The chambers 58 and 60 are provided respectively with corresponding access holes 64 or 66 for maintenance and replacement operations.

If it is desired, for example, to operate inside the chamber 58, the reactor is shut down and the pressure therein is reduced to atmospheric pressure. The blowers which open into the chamber 58 are stopped, and the operating staff then quickly seal off the blower openings as well as a communication opening 68 which may be formed in the wall 62. Any exchange between the atmosphere of the chamber 58 and the coolant circuit is thus excluded, thereby making it possible to operate under the desired conditions. Subsequent start-up can take place after the reverse operations have been performed.

The chambers 58 and 60 which are shown to be of equal volume in FIG. 6 can evidently have very different capacities.

I claim:

1. A nuclear reactor having a pressure vessel, a reactor core in said pressure vessel, a heat exchanger in said pressure vessel for heat exchange between the reactor coolant fluid and a second fluid, a biological shield in said pressure vessel separating said core and heat exchanger and defining with said vessel a chamber for said heat exchanger, and a plurality of passages in said biological shield for the circulation of said coolant fluid between said reactor core and said heat exchanger, wherein said heat exchanger comprises an internal circuit in said chamber for said second fluid, said internal circuit comprising a plurality of substantially identical elongated tubular units, the length and cross sectional dimensions of said units being small as compared to the length and cross sectional dimensions of said chamber, dismountable fluid-tight coupling means for removably assembling said units in end to end relationship, a plurality of parallel adjacent tubular rows each formed by a plurality of said units in end to end relationship, collector means, means for removably connecting each of said rows in parallel relationship to said collector means, the length of said rows and the length of said chamber being so proportioned that a space free of said units and having a length at least equal to that of one of said units is provided between one end of each of said rows and the adjacent wall of said vessel.

2. A nuclear reactor as described in claim 1, said pressure vessel being disposed on a vertical axis and said core and said heat exchanger being disposed with said core above said heat exchanger, and means for circulating said coolant fluid in a closed loop downwardly from said core to said heat exchanger through said biological shield and then upwardly from said heat exchanger to said core in conduit means located around said heat exchanger, through said biological shield and around said core successively.

3. A nuclear reactor having a pressure vessel, a reactor core in said pressure vessel, a heat exchanger in said pressure vessel for heat exchange between the reactor coolant fluid and a second fluid, a biological shield in said pressure vessel separating said core and heat exchanger and defining with said vessel a chamber for said heat exchanger, and a plurality of passages in said biological shield for the circulation of said coolant fluid between said reactor core and said heat exchanger, wherein said heat exchanger is divided into a plurality of sections, each of said sections including separate coolant fluid circuits, a compartment for each of said circuits, pressure-free wall means separating said compartments, and means for sealing off said wall means for repair and maintenance of one of the sections while the remaining of said sections remains in service.

References Cited by the Examiner
UNITED STATES PATENTS

| | | | |
|---|---|---|---|
| 2,946,732 | 7/1960 | Wootton | 176—60 |
| 3,105,805 | 10/1963 | Rodwell | 176—60 |
| 3,110,288 | 11/1963 | Worley | 176—60 |
| 3,205,140 | 9/1965 | Coudray et al. | 176—60 |

FOREIGN PATENTS

| | | |
|---|---|---|
| 1,210,168 | 9/1959 | France. |
| 814,057 | 5/1959 | Great Britain. |

CARL D. QUARFORTH, *Primary Examiner.*

L. DEWAYNE RUTLEDGE, *Examiner.*